(12) United States Patent
Deemie et al.

(10) Patent No.: US 6,510,539 B1
(45) Date of Patent: Jan. 21, 2003

(54) SYSTEM AND METHOD FOR PHYSICALLY MODELING ELECTRONIC MODULES WIRING

(75) Inventors: Debbie L. Deemie, Apalachin, NY (US); Christian R. LeCoz, Endwell, NY (US); Glen E. Thomas, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,990

(22) Filed: Oct. 29, 1999

(51) Int. Cl.[7] .................................................. G06F 3/00
(52) U.S. Cl. ............................................. 716/2; 712/12
(58) Field of Search .............................. 716/1, 2, 5, 12, 716/16

(56) References Cited

U.S. PATENT DOCUMENTS

| | | | |
|---|---|---|---|
| 4,949,275 A | 8/1990 | Nonaka | 364/490 |
| 5,610,833 A | 3/1997 | Chang et al. | 364/491 |
| 5,644,500 A | 7/1997 | Miura et al. | 364/490 |
| 5,675,521 A | 10/1997 | Holzhauer et al. | 364/578 |
| 5,677,847 A | 10/1997 | Walling | 364/488 |
| 5,777,383 A | 7/1998 | Stager et al. | 257/700 |
| 5,790,414 A | 8/1998 | Okano et al. | 364/488 |

OTHER PUBLICATIONS

Yu, Man–Fai et al., "Single layer fanout routing and routability analysis for ball grid arrays", Nov. 1995, IEEE, 581–586.*

Wu, Paul. "Substrate Technology Reduces BGA Cost While Increasing Pin Count", *Electronic Pacaking & Production*, Aug. 1997, pp. 93–94, 96.

ProLinx Labs. "ViperBGA Substrate Datasheet, White Paper, and Substrate Design Specification Formats". Copyright 1996. Accessed via the ProLinx home page at www.prolinx.com. 13 pages.

ProLinx Labs. "Welcome to OUr E.P.P.I.C. Booth". Accessed at http://sunfiretech.net/Eppic/p01b.htm. 2 pages.

ProLinx Labs. "ProLinx's New Copper–'Core BGA Elevates Performance and Thermal Dissipation Standards in PBGA Packaging". Accessed at http://sunfiretech.net/Eppic/p01d.htm. Copyright 1998. 3 pages.

ProLinx Labs. "Thanks You for Visiting Our E.P.P.I.C. Site". Accessed at http://sunfiretech.net/Eppic.p01c.htm. Copyright 1998. 3 pages.

"Encore(TM) PQ Package Qualifer", *Business Wire via NewsEdge Corp.* IEEC file 190 781, Apr. 8, 1999. 1 page.

Broglia, Patrizio. Extract from internal memorandum referring to "Amkor Anam AutoCad Tool." Apr. 20, 1999. 1 page.

* cited by examiner

*Primary Examiner*—John F. Niebling
*Assistant Examiner*—Stacy Whitmore
(74) *Attorney, Agent, or Firm*—Shelley M. Beckstrand

(57) ABSTRACT

A computer program receives a large plurality of module design parameters and provides as output a graphical representation of the design together with text files that rate module wireability, including die pad position, attachment of each die pad to its BGA pad, and net cross-over; summarizes input parameters; creates a truth table for rating wireability and thermal requirements; provides cost sensitive parameters such as gold area, drill size and number requirements.

25 Claims, 14 Drawing Sheets

OUTPUT DISPLAY

```
CHIP SETTINGS
Chip size: 7x7 mm
Chip Pitch: 60 microns
Closest Pitch Pads: Any Orthogonal Adjacent
Chip Pad: 70 microns Square
Chip Thickness: 500 microns
Chip ID: 436
Power/Ground Ratio: 24.54%
```

↙ 134

```
LAMINATE SETTINGS
Technology: w/b
Style: cavity
Layup: 2S0P
Size: 23 mm
Matrix: 27x27
Outer Rows: 4
BGA I/O: 368
% Ground/Voltage BGA: 10.60%
Jedec Ball Matrix Tight: no
BGA Pitch: 0.8 mm
BGA Pad: 425 microns
BGA Procoat: 475 microns
Line Width: 26.2 microns
Thermal Balls: 0
Number of Rings: 1
Ground Ring Width: 400 microns
Voltage Ring Width: 400 microns
Ring-Ring Space: 200 microns
Die to Ring or Cavity Space: 500 microns
Chamfer Leg: 1.5 mm
Drill: 200 microns
Via Pad Size (Front): 400 microns
Via Pad Size (Back): 450 microns
Dogbone Width: 200 microns
Dogbone Length: 435 microns
Outside Voltage Divider: 500 microns
```

SYSTEM AND METHOD FOR PHYSICALLY MODELING ELECTRONIC MODULES WIRING

BACKGROUND OF THE INVENTION

1. Technical Field of the Invention

This invention pertains to modeling. More particularly, it pertains to physical modeling of electronic modules, including interconnection of chip and chip carrier.

2. Background Art

Typically there are several ways for modeling chip and chip carrier interconnection layouts.

One approach is to review a data base of all previously designed modules, and select the one with matching fundamental parameters, such as die size, laminate size, number of chip input/output. A problem with this approach is the difficulty of identifying and dealing with all of the parameters required.

Another approach is to build the design from the start. This is time consuming process that often results in discarding the design as the parameters change due to new requirements and/or design objectives.

A third approach is to layout or sketch the die and laminate manually. The problem with this approach, again, is the level of skill and experience required, the difficulty of identifying and dealing with all of the parameters required, and the difficulty of visually expressing and modifying the design.

There is, consequently, a need in the art for a method and system for providing a quick and visual representation of a complicated module design which takes into account all relevant parameters. Such is needed for early modeling a more complex process and would be useful for early design and quick modeling chip carriers, such as plastic ball grid array (PBGA), flip chip, or wirebond chip carriers.

It is an object of the invention to provide an improved system and method for simulating and graphically assessing the cost and feasibility of general and specific wiring design cases.

It is a further object of the invention to provide a system and method for simulating general and specific wiring design cases and quickly assess the simulated design graphically.

It is a further object of the invention to provide a system and method for assessing a simulated wiring design with respect to crossing, choking, signal runs, wiring channels and input/output.

It is a further object of the invention to provide a system and method for providing simulated design graphical data to a wiring design tool.

SUMMARY OF THE INVENTION

In accordance with the preferred embodiment of the invention, a system and method is provided for modeling and estimating substrate characteristics preliminary to preparing a detailed design. Input parameters include die size and substrate size and, optionally, a netlist of interconnections between the die and substrate. Responsive to these input parameters, a representation of an optimized estimated fanout of the interconnections is graphically presented together with a set of substrate parameters derived from the optimized estimated fanout.

In accordance with an aspect of the invention, there is provided a computer program product configured to be operable to graphically model an optimized fanout of die to substrate interconnections.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
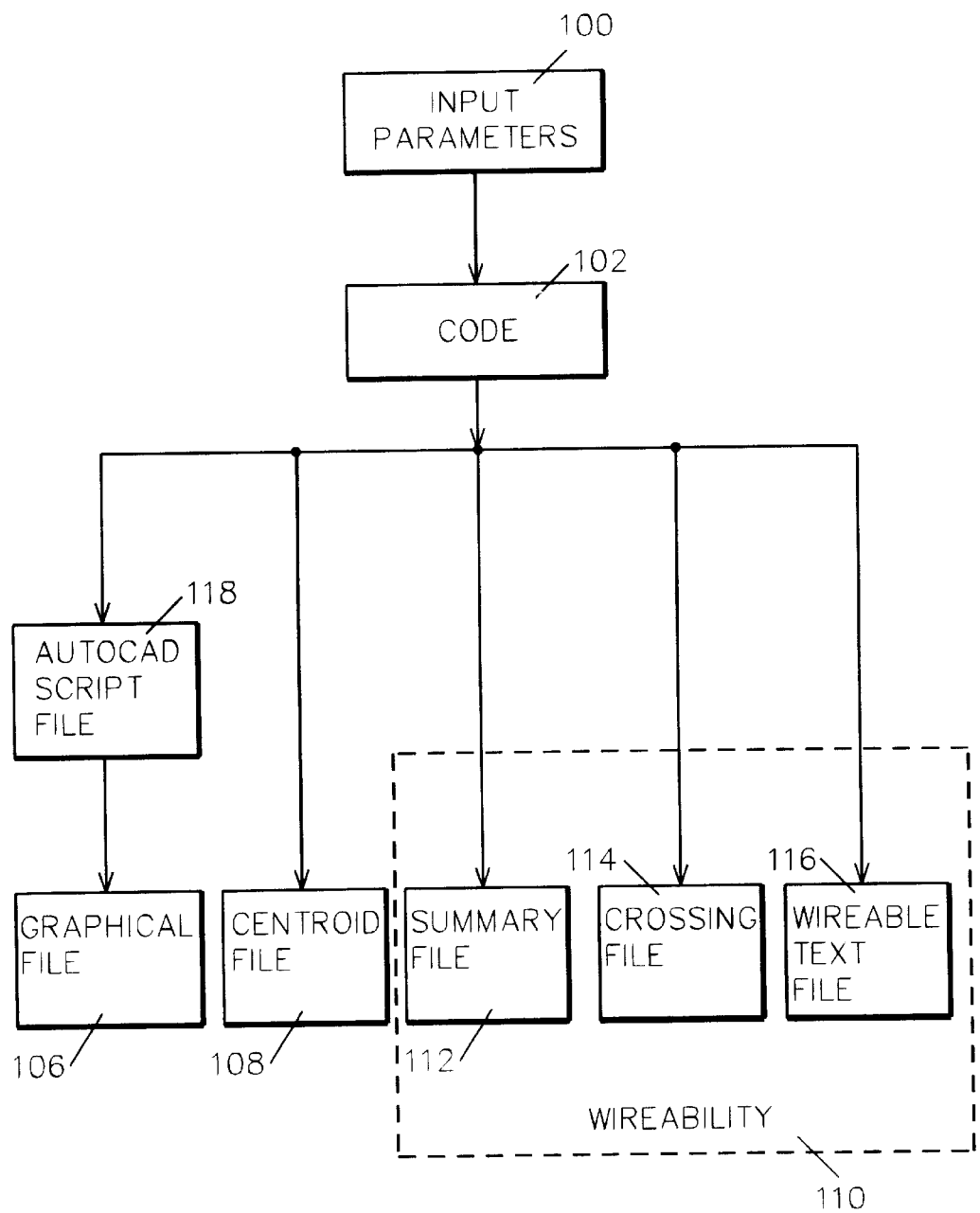
FIG. 1 is a high level flow diagram of the method in accordance with the invention for early design and modeling of an electronic module.

Referring to FIG. 1, input parameters 100 are received and input to code module 102 running in a main frame or PC using REXX language and/or Windows type interfaces. The output of code module 102 includes script file 118 and graphical file 106, centroid file 108, and wireability files 110, including summary file 112, crossing file 114, and wireable text file 116.

Figure 2:
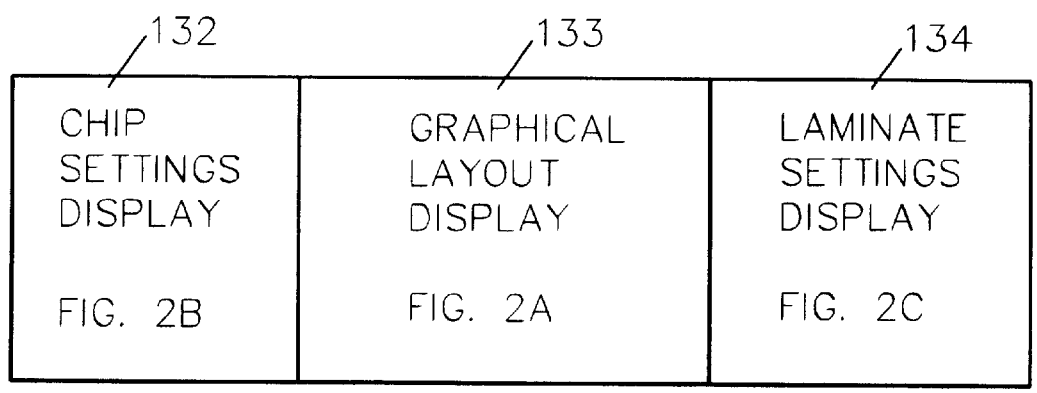
FIGS. 2A–2C, arranged as shown in FIG. 2, represent an output display in accordance with the invention.
Figure 3:
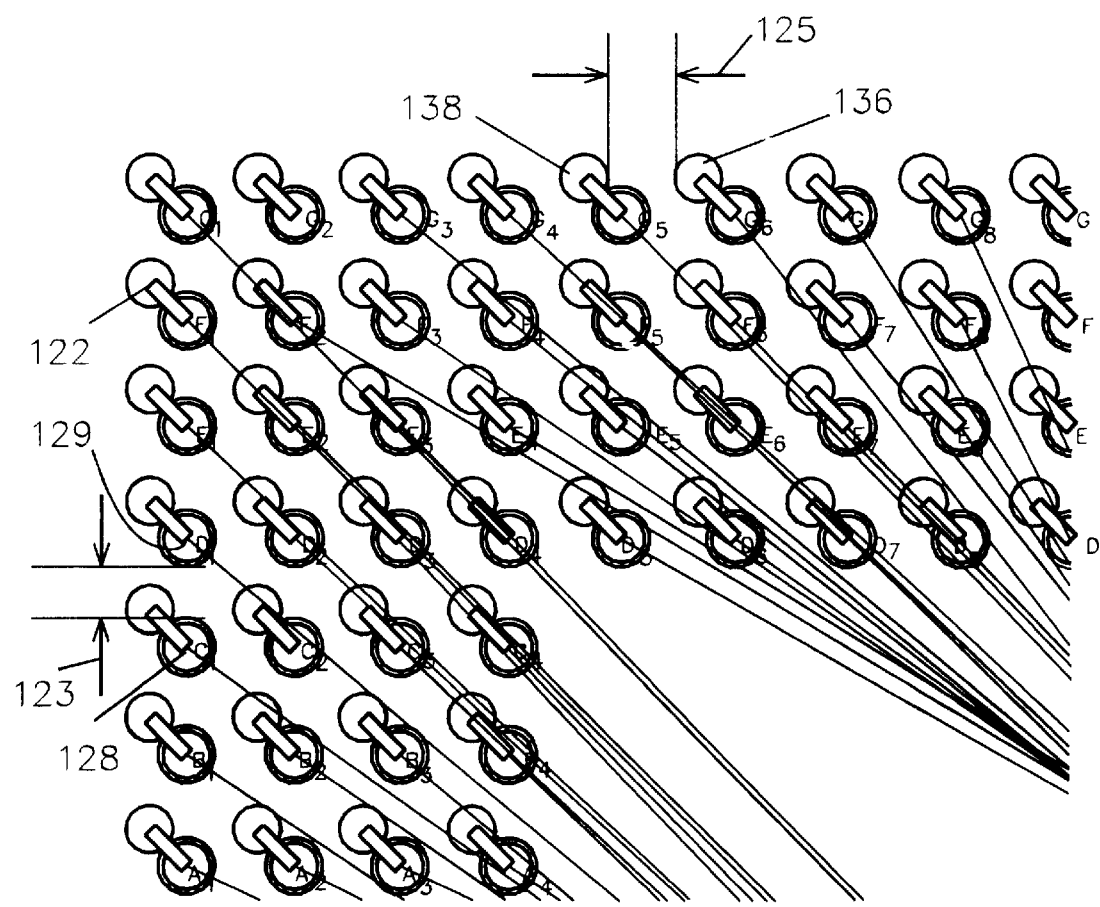
FIG. 3 is an enlarged view of the upper right corner of the display of FIG. 2B.
Figure 4:
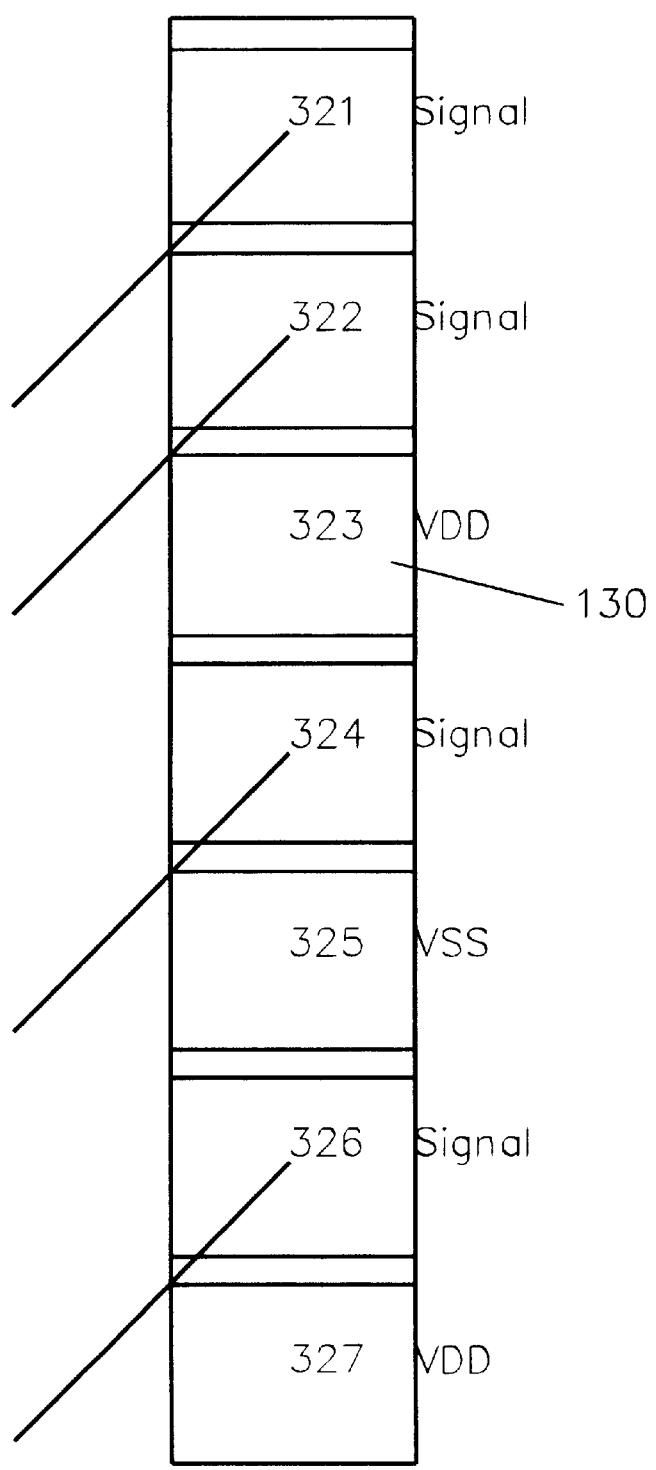
FIG. 4 is, in mirror image, an enlarged view of chip pads shown in FIG. 2B.

Graphical file 106 includes and when printed or displayed provides, as is illustrated in FIG. 2, an annotated graphical drawing of the module design, including graphical layout display 133 showing the point to point connections between die or chip pads 120 to ball grid array (BGA) pads 122. The annotations include alpha numeric pad row and column identifiers 124, 126, BGA pad designations 128, chip pad designations 130, chip input parameters 132, and chip carrier, substrate or laminate parameters 134. These are shown enlarged in FIGS. 3 and 4.

Centroid file 108 includes die pad number, chip pad name, X-Y position of chip pad center, quadrant, BGA alpha-numeric designation (when applicable), X-Y position of BGA pad center, and chip pad to BGA pad line slope. (An example of centroid file 108 is shown in Table 2.) The slope column indicates the slope of the line described by the direct line from chip pad to BGA pad, and is tracked for closest slope routing. Also, in the north and south quadrants the slope is defined as x/y whereas in the east and west quadrants it is the traditional y/x. This is done in as much as direct north y/x explodes into the undefined value 1/0. The crossing column indicates how many lines cross a particular line.

Figure 7:
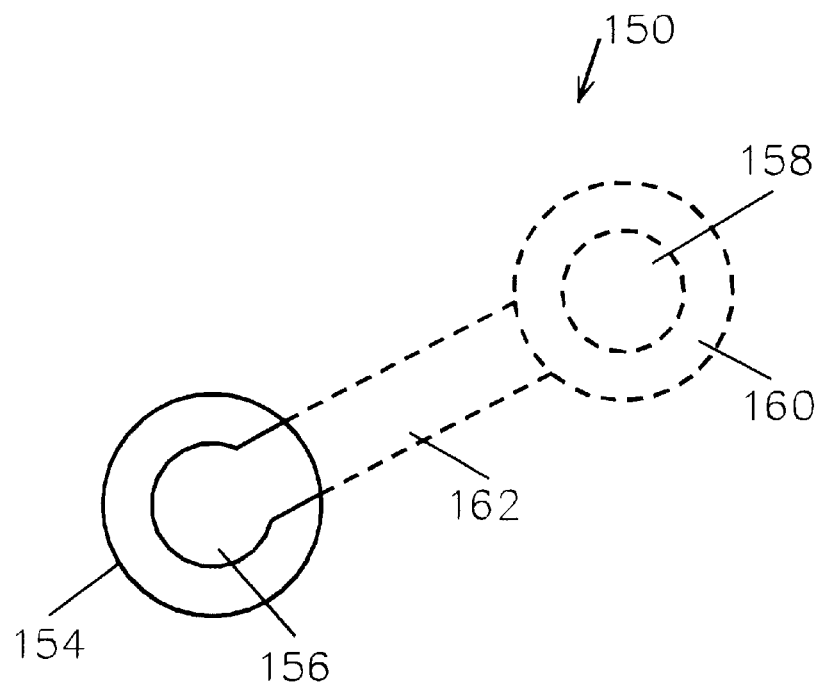
FIGS. 7 and 8 are two views of a ball grid array (BGA) connection system.
Figure 8:
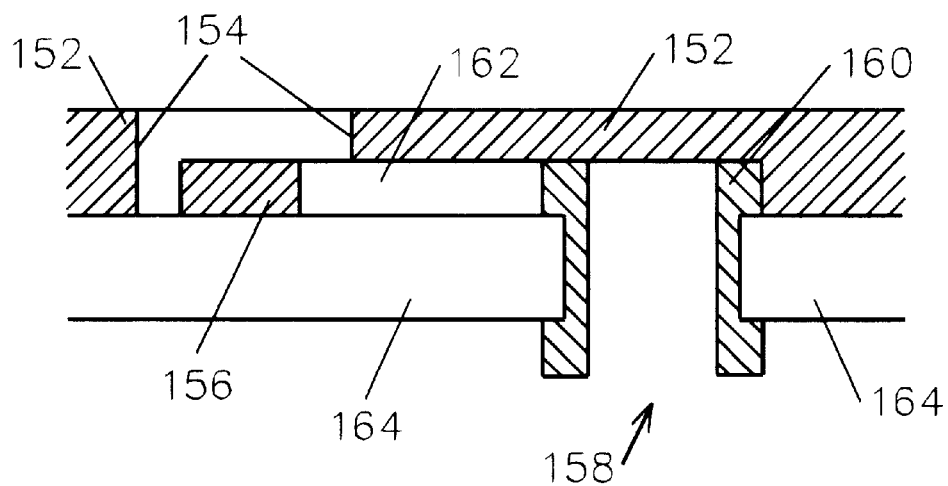
Figure 9:
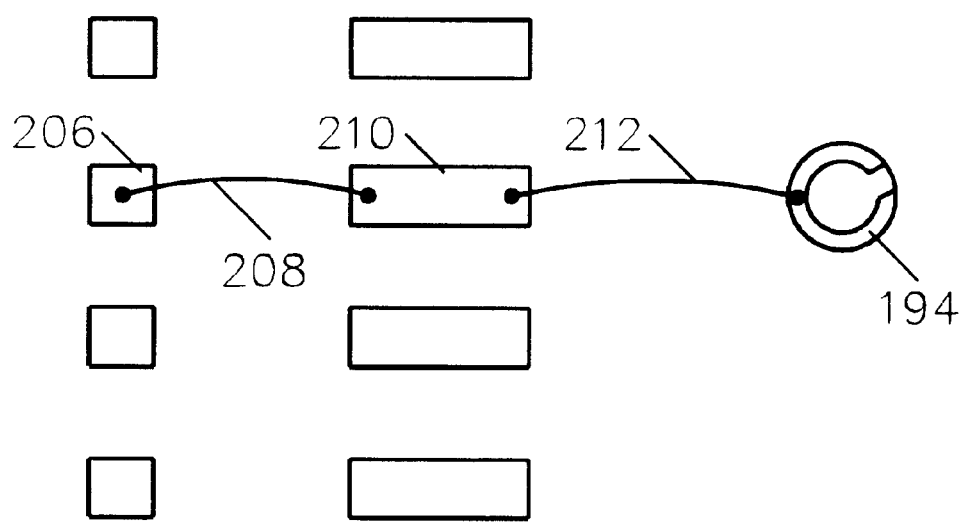
FIG. 9 illustrates a wire bond attachment system.
Figure 10:
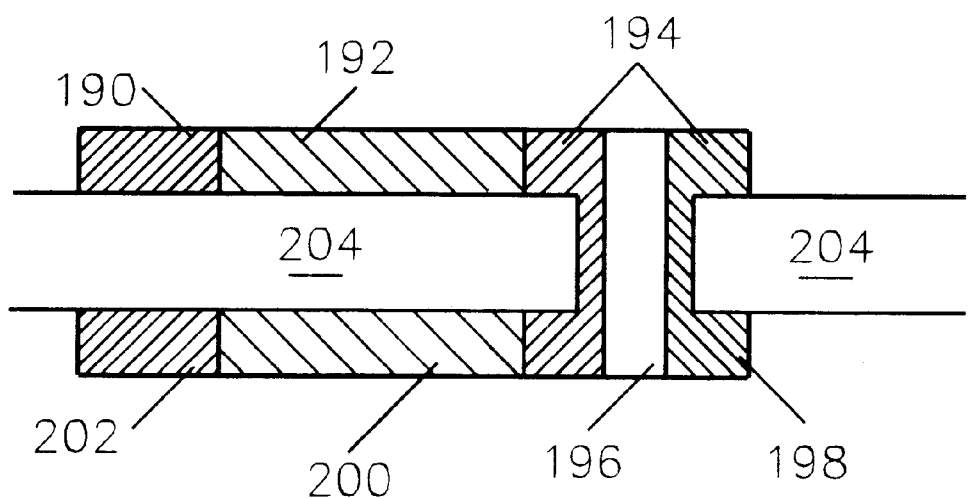
FIG. 10 illustrates a flip chip attachment system.

FIGS. 9 and 10 illustrate the interconnect configuration for flip chip, and FIGS. 7 and 8 illustrate the interconnect configuration for wire bond. Flip chip interconnection includes chip attach pad 190, wire 192, top via land 194, via 196, bottom via land 198, dogbone 200, and bga pad 202, on substrate 204.

FIG. 8 illustrates a wiring configuration with wire bond fingers. Interconnection is from die pad 206, to wirebond 208, to wire bond finger 210, to wire 212, to top via land 194.

Figure 11A:
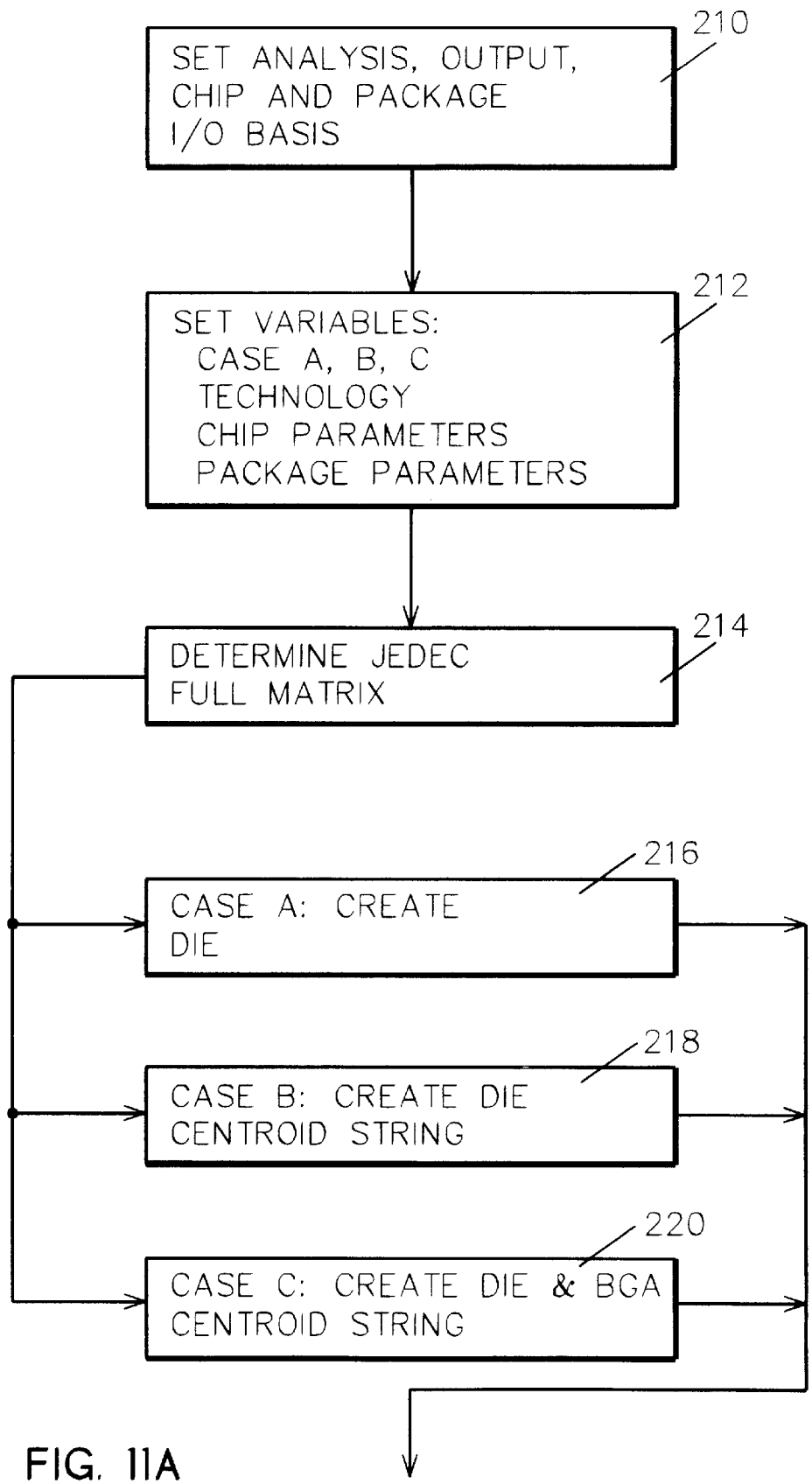
FIGS. 11A–11C, arranged as shown in FIG. 11, are a flow diagram of the method steps of the invention.
Figure 11B:
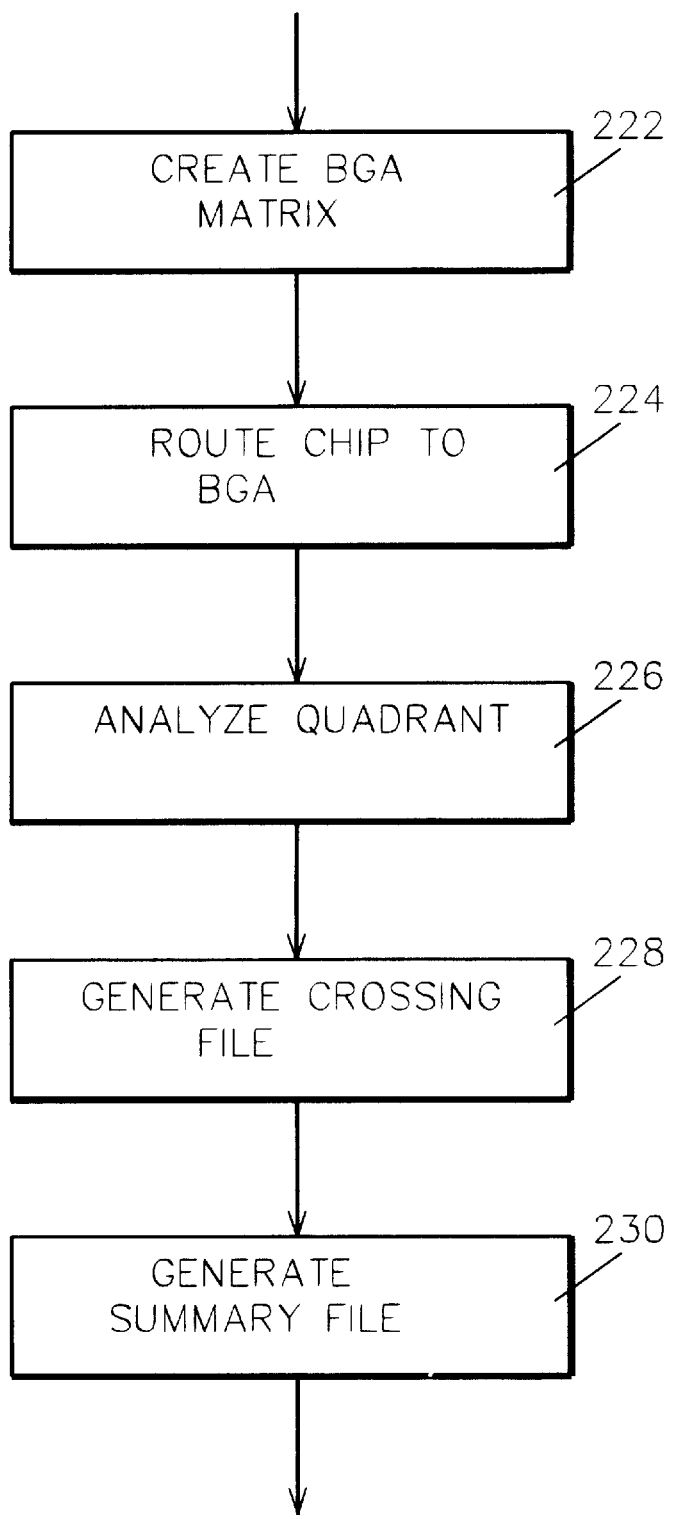
Figure 11C:
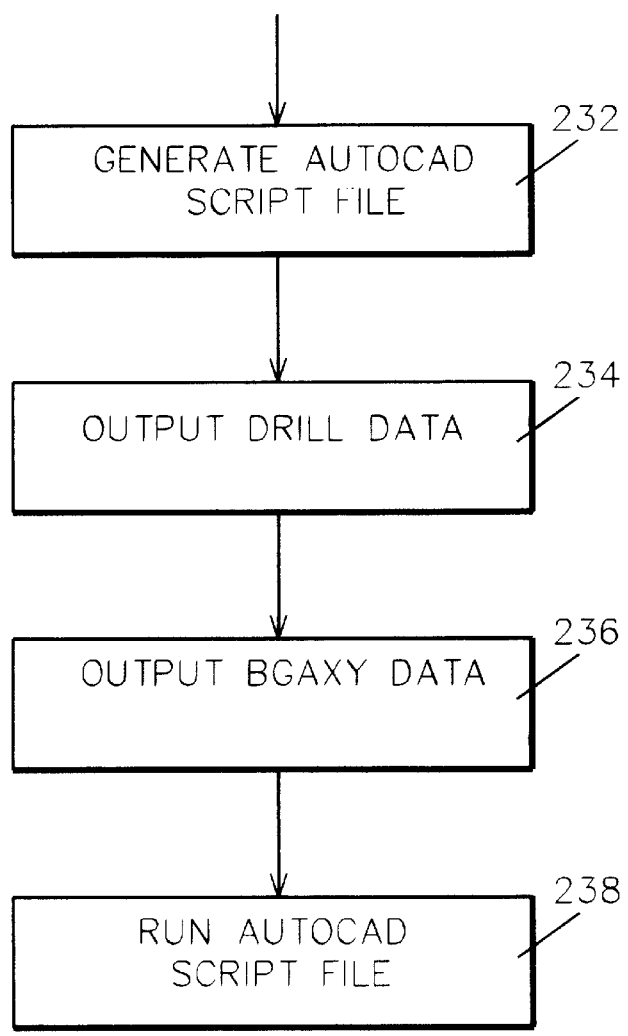
Figure 11:
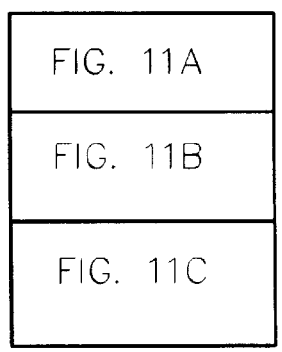

Referring to FIG. 11 in connection with Table 1, the processes executed by code 102 are set forth pseudo code.

TABLE 1

CODE

STEP 210: Set Analyses/Output/Chip and Package IO Basis
    Graphical Script
        Physical
        Mechanical
    Text Files
        BGAXY
        Drill Data
        RFS
        Quadrant Analysis
        Quadrant Crossing
            Specify # IO or Pitch
                Chip
                Package
STEP 212: Set Variables
    Case A, B, C
        Case 'A'=Random Die, Random Netlist
        Case 'B'=Specified Die, Random Netlist
        Case 'C'=Specified Die, Specified Netlist
    Set Technology
        Flip Chip
        Wirebond
    Define Chip Parameters
    Define Package Parameters
        Circuitization rules
        Package General Parameters
        Package Thermals
STEP 214: Jedec Full Matrix Determination given Package Size/BGA Pitch/Tight or Loose
    Find Matrix Polarity
    Quadrant Dividing Slope
    Depopulation Determination
        Per Module IO Set or Outer Row Set
    Define Alphas for Row Number
STEP 216: Create Die (Case A)
    Flip Chip
        Define Matrix Per IO or Chip Pitch
            Determine Polarity of Matrix
            Construct the Die Centroid String (#, X,Y, Quadrant)
            Assign Ground/Voltage and Signals Randomly per Set PCT (#,Name, X, Y, Quadrant)
            Calculate Composition Ratios (Signals and G/V's), #Signals, # Grounds, # Vlt per side
    Wirebond
        Define Pads per Side or Chip Pitch
        Construct the Die Centroid String (#, X,Y, Quadrant)
        Assign Ground/Voltage and Signals Randomly per Set PCT (#,Name, X, Y, Quadrant)
        Calculate Composition Ratios (Signals and G/V's), #Signals, # Grounds, # Voltages side
STEP 218: Create Centroid String for Die (Case B)
    Input Die Centroid Data
    Assign a Quadrant
        Sort in Sequential Order/CCW Feed
    Determine Minimum Chip Pitch and Kerf
        Calculate Composition Ratios (Signals and G/V's), #Signals, # Grounds, # Voltages on perside
STEP 220: Create Centroid String for Die and BGA (Case C)
    Input Die and Netlist
        Assign a Quadrant
        Calculate Composition Ratios (Signals and G/V's), #Signals, # Grounds, # Voltages on perside
STEP 222: Create BGA Matrix
    Find X,Y, Slope, Side (Assign Border BGA's to Quadrants Evenly)
    Determine Alphanumeric per Matrix and Cavity/Dieup
    Centroid BGA Dataset (X,Y, Slope from 0,0, Side, Alphanumeric)
    Punch Out Depops
    Separate into separate matrices by Quadrant
    Assign Type (Ground, Voltage, and Signals) for each BGA TABLE 1-continued

CODE

STEP 224: Chip to BGA Routing
    Case A and Case B Routing
        Separate Chip Centroid into matrices by Quadrant
        Closest Slope Search Routine
        Output String (#, Name, Chipx, Chipy, Side, Alphanumeric, BGAx, BGAy, Slope)
    Case C Routing
        Calculate Row, Column Position from Alphanumeric
        Add Slope to String
STEP 226: Quadrant Analysis Routine
    Calculate Runs
    Calculate Power Levels and Quadrant Location
    Calculate Number of WB Fingers Needed
    Print to a File
STEP 228: Crossing Factor Analysis
    Take each Routing and count the number of times it is crossed by another line within Quadrant
        Use Cramer's Rule to solve two equation/two unknowns.
    Append Centroid String to include Crossing Count
    Rank in Descending Order
    Print to a File
STEP 230: Summary (RFS) Analysis
    Calculate Line Width/Space for 1 thru 8 LPC on BGA side
    Calculate Line Width/Space for 1 thru 8 LPC on Die Up Side
    Match Wiring Rules to above
    Calculate Distance Left for Fingers plus Fanout for Dieup and Cavity
    Calculate Choke Factor which is fanout space/Wiring Pitch (12)
    Gold Area Calculation (10)
        Set Goldcost, Nickel Cost, and thickness
        Ground Ring Area+Voltage Ring Area+Finger Area
        Full Gold Via Area on Cavity (Lands+Inner Walls); estimate Via Count
        Flower Pad Calculation
        Selective Gold Via Area on Die UP (Lands+Inner Walls); estimate Via Count
        BGA Area
        Stiffener Area
        Cavity Wall
        Wiring Area Front and Back
        Gold Runner
    Summation of Total Gold for Die Up
    Summation of Total Gold for Cavity
    Complexity Factor
        Die Area/Signal Count...Die Escape Factor
        Die Area/ChipIO.......Chip Density Factor
            Laminate Area/Signal Count....BGA Escape Factor
    Flatness Calculation
        Drill Count Calculation
    Print All to Summary File plus Key Input Parameters
STEP 232: Autocad Scrip Generation
    Construct All Layers
    Define Laminate Coordinates for Top View and Side View
    Define Die Coordinates for Top View and Side View
    Draw Chamfer
        If Mechanical Document Package
            Side View of Laminate
            Side View of Die
            Top View of Lid
            Side View of BGA Ball
            Side View of C4 Balls
            Spacing between Plan View and Side View
            Draw Side View and Move it over
                Draw Top View of Lid
        If Physical
            Draw Multi Vertice RATS(13)
            Draw BGA, Procoat, Middle of Bone and Holes (Print Holes to File too)
                Set on a 45 Degree Angle According to Octant
            Draw Flower Pad Construction Circles
            Draw Voltage and Ground Plane Outlines
            Draw Ground Ring and Voltage Ring(s)

TABLE 1-continued

CODE

Draw Chip Pads and Chip Text
Draw BGA Alphanumerics on 4 sides
Draw Aphanumerics on BGA Balls Themselves.
Print Out Chip Parameters to the Left of
Drawing and Substrate Parameters to rt.
Print to an Autocad File
STEP 234: Print out Drill Data
STEP 326: Print out BGAXY Data
STEP 238: Run Autocad Script File from Autocad.

Referring to Tables 2 and 3, a "rat" is a colloquial term meaning an unedited straight line that emanates from the center of a die pad to a ball grid array (BGA) pad, or analogous connections on a mother board. It is then manipulated by moving within a layer and/or placing part of the path on other layers of the package. In the examples of Tables 2 and 3, the centroid data of a die has been created and routed out to the center of a BGA pad, either by a customer definition (case C) or by creation within the program (case A).

In Tables 2 and 3, the numbering (No.) convention is counterclockwise. Identifier (ID) represents the name assigned. Typically, but not in the examples of Tables 1 and 2, signals are given unique names, such as Signal1, Signal2, etc.

CHIPX is the X dimension to the center of die with reference to the center of the package (0,0). CHIPY is the Y dimension to the center of die with reference to the center of the package (0,0). SIDE is the quadrant (north, south, east or west) to which the die belongs. ALPHA is the alphanumeric position of the ball grid array (BGA) pad as defined by the Jedec Standard. BGAX is the X dimension to the center of the BGA pad with reference to the center of the package (0,0). BGAY is the Y dimension to the center of the BGA pad with reference to the center of the package (0,0).

Figure 2A:
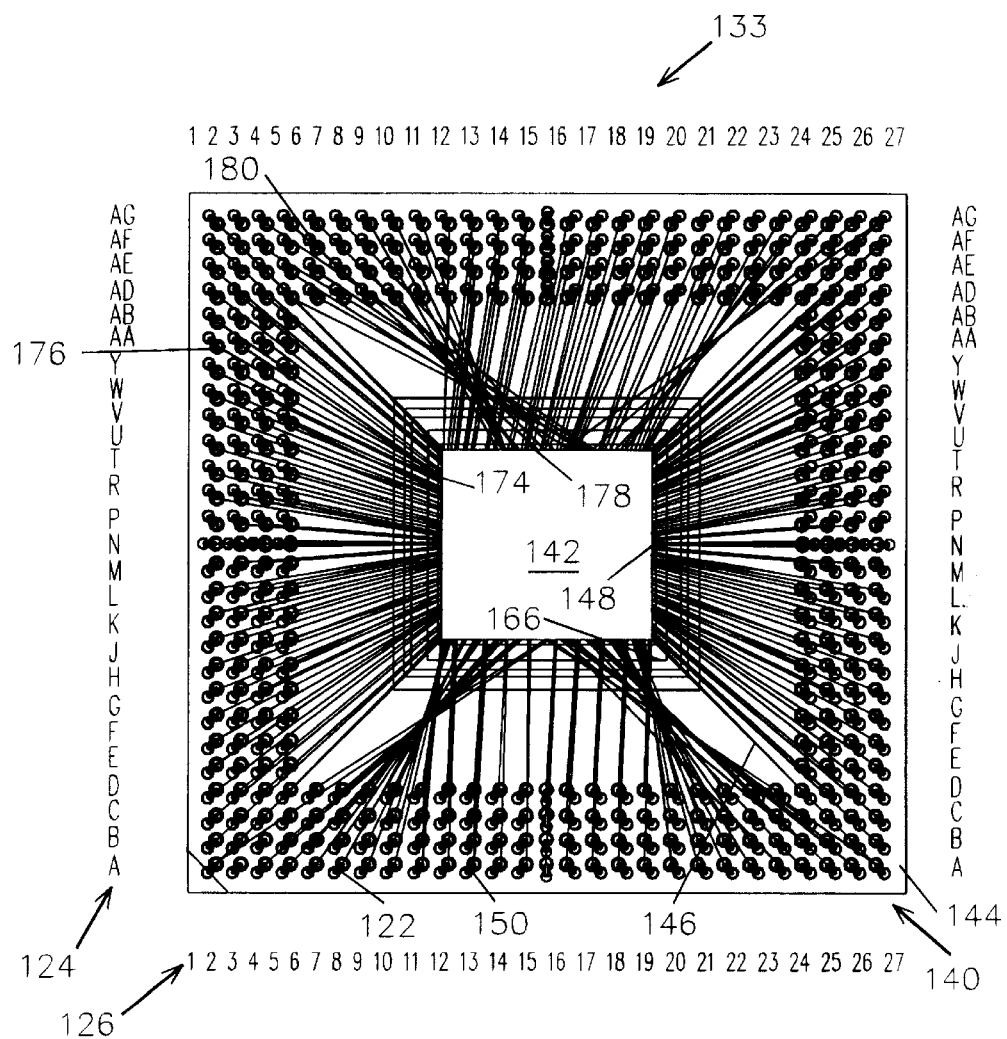
Figure 2B:
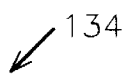

Table 3 is the centroid file 108 for the example illustrated in FIG. 2A.

Summary file 112 includes six tables:
(1) Table 4: chip statistics (die size, die pitch, die pad size, and die matrix size), chip input/output total and per quadrant, number of signals total and per quadrant, ground and voltage pads on the chip total and per quadrant.
(2) Table 5: module statistics, including module input/output input parameter, number of signal pads, voltage and ground pads, percent number of signal BGA pads per total BGA pads, percent number of ground and voltage BGA pads per total ground and voltage BGA pads; module laminate size; BGA pad pitch; BGA matrix size (rows by columns); full matrix or depopulated matrix identifier; die facing parameter (whether die pads are facing toward or away from carrier); enumerate the number of voltage rings; wire bond length, space for fingers plus fan out wiring, space for fan out wiring;
(3) Table 6: truth table for testing that five required parameters (Table 7) evaluate true, as follows:
first, wiring distance between wire bond fingers and either (a) the edge of via lands on an upper facing die, or (b) either the procoat opening or copper diameter of BGA pads on a downward facing die;
second, enough BGA pads for number of chip signal pads;
third, enough wiring channel capacity to match total die signal count (Referring to FIG. 3, wiring channel 123 represents the spacing between adjacent procoat openings for downward facing die, and wiring channel 125 represents the spacing between via pad 136 and closest via pad 138) for, based on the amount of depopulation, the number of channels is calculated and multiplied by three lines per channel and four lines per channel;
forth, calculated wire line width compared with minimum manufacturing line width capability (which is an input requirement);
fifth, calculated wire line space compared with minimum manufacturing line space capability (which is an input requirement);
(4) Tables 8 and 9: calculated density factors, including
first, calculated choke factor (choke=channel space divided by (line space plus the line width)), back door vias (vias located in the space between the inner most edge of bond finger on the laminate and the outer most edge of the most outer voltage ring);
second, chip escape factor (die area divided by number of chip signal pads);
third, chip density factor (die area divided by number of chip I/O pads); and
fourth, BGA escape factor ((laminate area minus die area)/number of chip signals), for giving an estimate of density of wiring in the global area of the laminate for chip escape.
(5) Tables 10 and 11: gold area, including BGA pads, cavity wall (for wire bond), via areas, wiring surface front and back, wire bonding surfaces, gold stiffener (if included), including total area and cost, and minimum total thermal resistance required based on ambient temperature, chip power, and junction temperature.
(6) Tables 12 and 13: other miscellaneous statistics and parameters.

TABLE 4

CHIP STATISTICS

Die Size = 8.00 mm × 8.00 mm
Die Pitch = 125 microns
Die Pad Size = 70 microns
The Die Matrix = 60 × 60

| Chip I/O (total/side) | Chip Signals%/# Side | Chip G&V%/# Side |
|---|---|---|
| 240/60 | 85.0%/51/204 | 15.0%/9/36 |

TABLE 5

MODLULE STATISTICS

| Module I/O Count | Signal Ratio/Signal Count | G/V Ratio/G/V |
|---|---|---|
| 420 | 48.6%/204 | 51.4%/216 |

Module Size = 35 mm
BGA Pitch = 1.27 mm
Matrix Size = 26 × 26
This is a 5 outer row configuration
This is run is for a cavity part.
This is run is for a 2SOP part.
There are 1 voltage ring(s) in addition to the Ground Ring

TABLE 7

PARAMETERS TEST OUTPUT

First Position = Enough Wiring Room after Fingers (non-Choked)
Second Position = Enough BGA Balls for Chip Signals
Third Position = Enough Channel Capacity to match Signal TABLE 7-continued

PARAMETERS TEST OUTPUT

Count
Fourth Position = Wire Width above Minimum
Fifth Position = Wire to Wire Space above Minimum

TABLE 8

WIRE DIMENSION AND PITCH

Nominal Wire Bond Length is 2.4 mm.
Space for fingers plus fanout wiring    6.05 mm
Space for fanout wiring is    3.98 mm
Multiples of Pitch (Lower is more choked)    33.9
Back Door Vias selected (per Quadrant) is 10
Lines per Channel Selected is 4
Corresponding Line Width, Space, and Pitch is 51.0, 66.3, and 117.3 microns.
Procoat Registration is 25 microns.

| Lines/<br>Channel | Wire<br>Width | Wire<br>Space | Wire<br>Pitch |
|---|---|---|---|
| 1 | 148.6 | 193.2 | 341.8 |
| 2 | 90.7 | 117.9 | 208.6 |
| 3 | 65.2 | 84.8 | 150.0 |
| 4 | 51.0 | 66.3 | 117.3 |
| 5 | 41.8 | 54.3 | 96.1 |
| 6 | 35.4 | 46.0 | 81.4 |

Crossing file 114 includes four columns, including:
(1) chip pad number (same as centroid data, supra);
(2) quadrant (north, west, east, or south);
(3) BGA pad; and
(4) number of lines that have crossed the die pad to BGA pad line.

Code 102 analyzes each connection line for the number of times any other connection line crosses it. The more crosses, the tougher the design. This file is sorted in descending order of number of crossings, so that the top of the file identifies the lines (or, nets) that are not well placed. Table 14 is an example of the top part of a crossing file 114.

An optional output is illustrated, in part, in Table 15. Holes.txt is a file that gives the X, Y coordinates of where vias are positioned next to BGAs. These are calculated by code 102 from input parameters 100.

Wireable text file 116 (Tables 16 and 17) is multi-purpose. It provides a code 102 generated count of consecutive (that is, runs) signals or grounds or voltages—the larger the run of signals, the more difficult it is to wire. Code 102 scans the netlist which has either been generated or received as input, identifies the power and ground names and quadrant, and determines the number of wirebond finger positions needed.

Wireable text file 116 has two parts:
(1) Table 16: runs analysis, in which for each of the four quadrants runs are defined by the number of consecutive signals or consecutive power and ground lines, number of wirebond fingers needed per side, and a total number of die pads, signal pads, and ground/voltage pads.
(2) Table 17: net list scan, whether fabricated by program or provided as input, that enumerates the different voltage levels per quadrant.

Code 102 also generates script file 118. A session is opened in Autocad to run script file 118 to create therefrom graphical file 106.

Table 17 is a pseudo code representation of the process implemented by code 102 for generating script file 118. This is the script file that is "played" when in the Autocad environment to generate graphical representation 106, a display of which is shown in FIG. 2. In a preferred embodiment, script file 118 is an Autocad script file, but equivalent computer automated design (CAD) environments may also be used. This Table 17 sets forth editing friendly code within code 102 for the "RATS". Rats is a term referring to a straight line that emanates from the center of a die pad 178 to a BGA ball 180. It is then manipulated by moving within a layer and/or placing part of the path on other layers of the package 144. In this case, the centroid data of the die has been created and routed out to the center of the BGA pad; either by customer definition (Case "C") or by creation within the program 102 (Case "A").

As is set forth in Table 17, code 102 creates a line or rat from (Chipx, Chipy) to (BGAx, BGAy). This line is multi-verticed. Each rat has a width that is first zero and then increments to a final value with steps in the middle. It is stepped larger and larger as processing and graphical display moves counter clockwise (CCW) around the die. After code 102 creates the rats, Autocad displays graphical file 106 which shows where rats come from relative to the die sequence without having to window out and over to the die or having to select the wire to have a dialog box displayed. At the end of processing, all the wires are then converted to one width. Alternatively to using different line widths, the graphic display may use different colors.

TABLE 17

SCRIPT FILE GENERATION

```
/* RATS                    */
it rats=1 then do          /* Indicator in the program to have RATS
                              created* /
                           /*ratsline is the name of the matrix
                              that is a line for line autocad script
                              text file. The variable index is
                              line1, line2......*/
ratsline.index='-layer set Rats '    /* Autocad command that
                                        creates a layer with
                                        Autocad that all RATS are
                                        drawn in; this is a
                                        drawing organization
                                        technique* /
index=index+1              /* increment index to write to the next
                              line*/
   do yy=1 to chipio       /* start stepping through the centroid
                              file line for line by incrementing
                              line.yy matrix */
                           /*# lab xc yc sd an xb yb s */
   parse value line.yy with v1 v2 v3 v4 v5 v6 v7 v8 v9
                           /* Take the Centroid Data file; read the
                              line and parse the string by using the
                              blanks as demarcation*/
Select
   when v6='' then do      /*V6 is the Alpha Numeric; when v6
                              is null, this is either a ground or
                              voltage, not a die to end BGA
                              signal connection*/
   otherwise               /* the line has to be a signal*/
   xfrom=v3;yfrom=v4       /* Start point is the die pad
                              centroid*/
   xinc=(v7-v3)/linesegments;yinc=(v8-v4)/linesegments
                           /* take the distance in both the x
                              and y dimension from the die pad to
                              the BGA and divide it by the number
                              of segments selected in code above
                              in program; this will give each
                              vertex of the line.*/
   rat=''                  /* give the string rat an initial
                              value of null string*/
                           /* note in REXX "||" is the
                              concatenation operator; it joins
                              text that is with quote marks*/
```

TABLE 17-continued

SCRIPT FILE GENERATION

```
    do ratpoint=1 to (linesegments+1)      /* start creating
                                              each point defining
                                              the vertices*/
    Select
        when ratpoint=1 then do            /* first point will be
                                              the die pad centroid*/
            rat=rat||v3||','||v4||' '      /* create the string that
                                              will become part of the
                                              autocad command
                                              language*/
        end
        when ratpoint=linesegments+1 then do
                                           /* end point will be the BGA
                                              pad centroid*/
            rat=rat||v7||','||v8||' '      /*create the string that
                                              will become part of the
                                              autocad command
                                              language*/
        end
        otherwise                          /* defining a vertex point
                                              other than the endpoints of
                                              the RAT*/
            xto=xfrom+xinc;yto=yfrom+yinc
            rat=rat||xto||','||yto||' '    /* This keeps
                                              accumulating the
                                              string of vertices
                                              into one string*/
            xfrom=xto;yfrom=yto            /* This makes the vertex that
                                              was defined as "to", as the
                                              "from" so the next point can
                                              ce calculated*/
        end                                /* the Select*/
    end                                    /* Do loop*/
    ratsline.index='pline '||rat           /* Autocad language command:
                                              pline x1 y1 x2 y2 x3 y3, etc*/
    index=index+1                          /* next line of the Autocad Script
                                              File ratsline.index*/
    if ratwidth>ratwidthmax then ratwidth =1
                                           /* if Rat width (line width)
                                              reaches a number greater than what
                                              was set, then set back to 1
                                              micron*/
    ratsline.index='width '||ratwidth      /* Create Autocad command
                                              that specifies the width
                                              of line by the command
                                              followed by the width as
                                              a numeric*/
    index=index+1                          /* next line of the Autocad Script
                                              File ratsline.index*/
    ratsline.index=blankline               /* Need a blankline to toggle
                                              the Autocad Proram to go back
                                              to "Command:' Prompt*/
    index=index+1                          /* next line of the Autocad Script
                                              File ratsline.index*
    ratwidth=ratwidth+ratwidthinc          /* increment the width of the
                                              line for the next Rat created
                                              in the next loop*/
    end                                    /*Select*/
end                                        /*Do Loop*/
end                                        /*End the If statement on whether
                                              Rats are part of the script*/
```

Depopulation refers to removal of a center most matrix of BGA balls to leave some number of outside rows. This is done to remove balls immediately under the chip site.

Referring to FIG. 2, an example output of graphical file 106 is illustrated for a wire bond constructed module. This shows an annotated plan view of a module 140 including chip 142, laminate 144 which includes wires 146 interconnecting chip pads 142 with BGA site 150 and associated via. This is further illustrated in FIGS. 7 and 8 where BGA site 150 includes BGA 156, procoat opening 154, procoat layer 152, substrate layers 164, top side 160 of plated through via 158, dogbone 162 (a dogbone is a connector between BGA pad 156 and via 160).

Voltage ring 166 is a continuous surface of constant width, generally, that is offset from and encompasses or surrounds chip 142 site. Some wires (the power and ground wires) from chip pads 148 connect to voltage rings 166. The innermost voltage ring 166 is usually the ground level. (For a flip chip constructed module, voltage rings 166 are not required.) Wire bond fingers 210, shown in FIG. 9, are not shown in FIG. 2. These are oblong shaped copper features that are placed between rings 166 and BGA procoat opening 154 in a die down configuration or between rings 166 and via lands 160 in a die up configuration.

Figure 5:
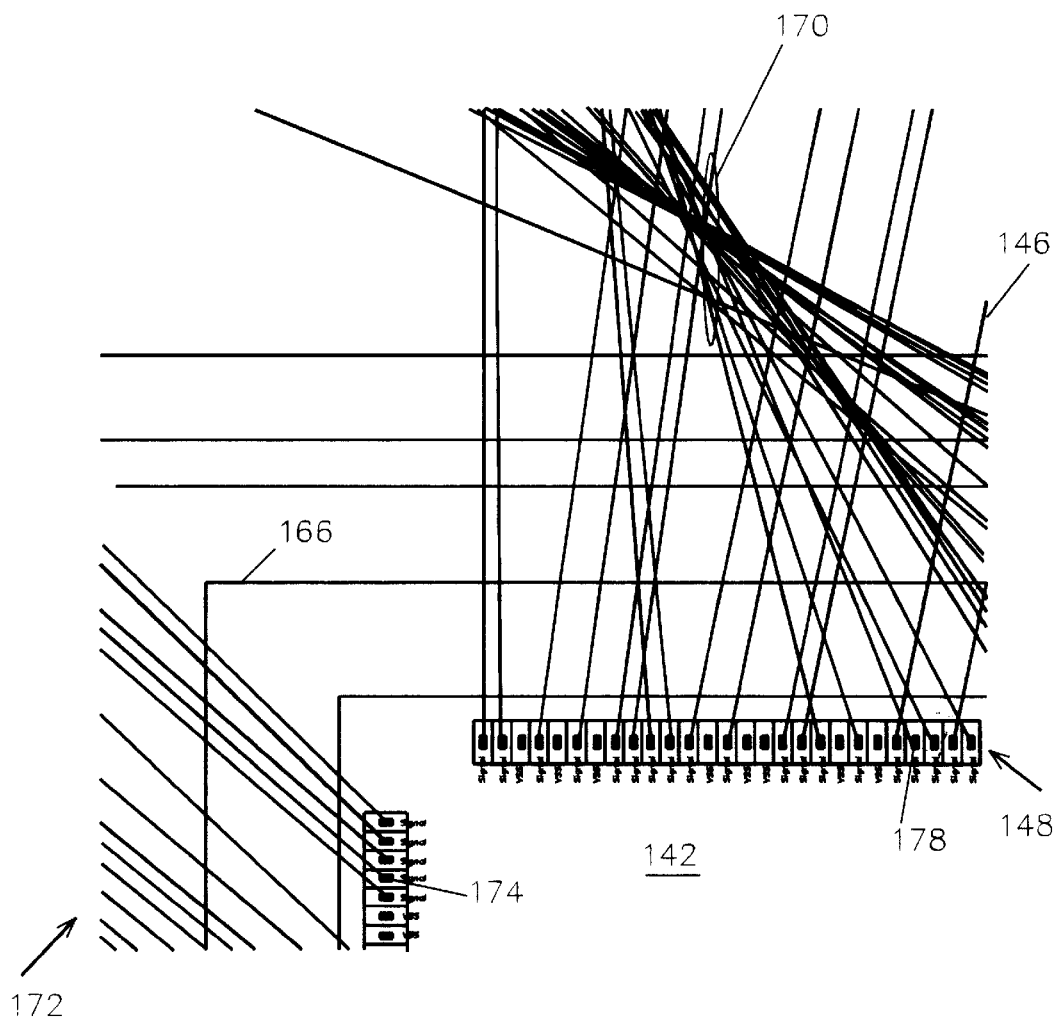
FIG. 5 is an enlarged view of a section of FIG. 2B illustrating cross over.
Figure 6:
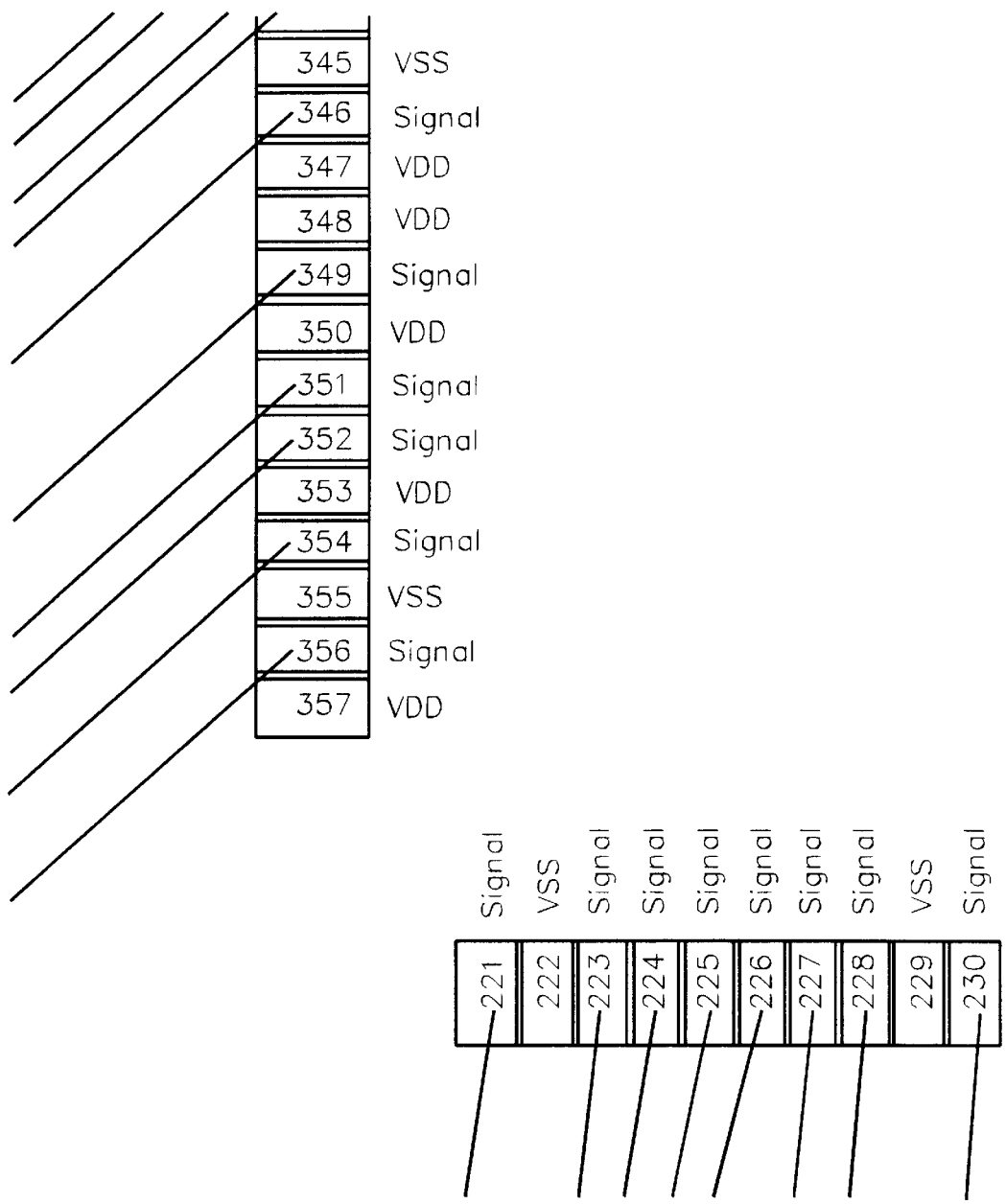
FIG. 6 is an enlarged view of a portion of FIG. 2B illustrating chip attach region labeling in accordance with the invention.

As shown in FIG. 2, and enlarged in FIG. 5, which is an enlargement of the north west corner of FIG. 2, on the west side there are circuit lines 172 which run between die pads 174 and BGA sites 176 (which only appear in FIG. 2) without crossover. On the north side, extensive cross over 170 occurs for lines interconnecting die pads 178 and and BGA sites 180.

FIG. 11 sets forth method steps executed within code module 102, and these are further described in the pseudo code representation of Table 1.

Set analysis step 210 controls the files 106–116 to be output, and the run mode. The user may specify the pitch of the die or the number of die I/O desired. Also, the user may specify the number of outer rows (matrix size minus (the depopulation divided by 2)) or the number of BGA I/O pads desired.

Set variables step 212 defines cases A, B and C. For case A, the user tells the program 102 that the die and net list are to be calculated by code 102 (that is, the program creates its own). For case B, the user specifies the die in terms of a die centroid file input without defining the net list. A net list is a listing of die pad connections giving pad number and/or die pad names to BGA connections in terms of alpha numeric coordinate. For case C, the user defines both the die centroid file and the net list. The assembly technology is set as flip chip or wirebond. Chip parameters are received as input, including such parameters as chip size, chip width, chip length, chip pitch, chip I/O, die pad size, die pad shape, and percent ground and voltage (defined above). Package parameters are defined, including such parameters as die up or cavity configuration, laminate size, module I/O count, number of outer rows, BGA pitch, number of vertex points defined for a line, number of rings, width and spacing of voltage and ground rings, size of via features (pad, dogbone, vias), increment of variable width, wire bond length, and wiring rules (minimum wire space and width).

Full matrix determination step 214, based on module size and pitch of BGA, calculates whether the number of columns is odd or even. Quadrant dividing slope is calculated, which is the slope of an imaginary line from the center of the package to the corner of the die, and an adjacent pair of these defines a quadrant. If the desired number of module I/O pads, or the number of outer rows, is provided by the user, the amount of depopulation is calculated. The Jedec alpha designation is entered for each row.

For case A, create die step 216 creates centroid data for flip chip or wire bond configuration. Table 17 sets forth the code 102 for step 216 generation of die. There are two cases of Generation of a Die: 1) Wirebond Single Row Peripheral, and 2) Flip Chip Area Array (which assumes square die).

For case B, create centroid data step 218, responsive to user provided centroid data, assigns each pad to a quadrant. This list is reordered, if needed, to a clockwise order while calculating the minimum chip pitch for output to graphical file 106 (minimum spacing between wire pads on a wirebound) and the curve (distance between edge of die and center line of outermost wire bond pad). Code 102 then calculates composition ratios.

For case C, create centroid step 220, assigns quadrants and calculates compositions (less work than case B).

TABLE 18

CENTROID DIE DATA GENERATION

```
/* Flip PADS CALCULATION . . . Case A */
if case='a' then closestpads='Any Orthogonal Adjacent'
                       /* Print Out in Graphical File that
                       keeps track of closest C4 to C4
                       distance*/
Select                 /* This Select chooses between
                       Flip Chip Routine or Wirebond
                       Routine* /
   when case='a' & tech='fc' then do   /* In the case of Flip Chip*/
      Select           /* This Select chooses between
                       setting the minimum C4 pitch to a
                       minumum or setting the number of
                       chip O*/
         when setchipcp='1' then do   /* If the chip pitch is specified,
                                     then do the following* /
            indent=edge+.5*dp    /* Figure out how far in the
                                 centerline of the first pad should be;
                                 edge (distance defined by user
                                 representing die edge to edge of die
                                 pad) + half a die pad width*/
            dist=cz*1000-2*indent  /* Figure out the span,
                                   in um when each indentation
                                   is taken out; cz=chip size in mm*/
            spaces=dist%cp     /* Take distance and divide by
                               chip pitch; cp. The % sign in
                               REXX takes the integer part only*/
            pads=spaces+1      /* The total numbers of pads
                               is 1 more than the total
                               number of spaces*/
            chipio=pad3*pads   /* The total number pads is
                               the matrix of pad by pad*/
         end
         when setchipio='1' then do   /* This is the case when
                                      you have a total number
                                      of chip IO in mind*/
            do n=1 to 1000     /* Start stepping from a 1X1
                               array, 2x2 array, etc until
                               nXn is larger than the
                               requested IO*/
               test=n*n-chipio
               if test n>=0 then leave /* when test is larger
                                       than 0, then this defines
                                       the matrix; it will give
                                       chipio >=1 rowx1row
                                       greater*/
            end
            pads=n
            indent=75+0.5*dp   /* Figure out how far in the
                               centerline of the first pad should
                               be; 75 um + half a die pad width*/
            dist=cz*1000-2*indent  /* Figure out the span,
                                   in um when each
                                   indentation is taken out;
                                   cz=chip size in mm*/
            cp=dist/(pads-1)   /* Figure out the chip pitch
                               by taking the number of space
                               (pads-1) and divide it into
                               the distance available*/
         end
      otherwise; end
                       /*Calculate Actual Chip Pads that
                       are G/V or signalg*/
      chipgv=chiprat/100*chipio%1  /*Take the Ground/Voltage
                                   Ratio; chiprat, which is
                                   an input parameter,
                                   multiply by chipio and
                                   take integer part . . . this
                                   gives the number of chip
                                   ground and voltage chipio*/
```

TABLE 18-continued

CENTROID DIE DATA GENERATION

```
      chipsig=chipio-chipgv     /*Take the total Chipio,
                                subtract out the chip ground
                                and voltage and this gives
                                the nunber of signals*/
                       /* Need the padssig variable for the
                       lines per channel calculation*/
      padssig=chipio%4           /*Padssig is the number of
                                 signals per quadrant*/
      if padssig//4>0 then padssig=padssig+1
                       /* Add one per side if there is 1,2, or
                       3 signal pads required*/
                       /*Polarity of C4 Matrix*/
                       /* Polarity of matrix means simply if
                       there is an odd number of columns/rows
                       it is odd; even it there is an even
                       number of rows*/
      c4Polarity='odd'           /*Assume the polarity is always
                                 odd*/
      if pads//2=0 then c4Polarity='even'  /* Test to see if
                                            the number of pads per
                                            side is evenly divisible by 2;
                                            remainder is set to even if
                                            it passes this test*/
                       /* Build the Dataset*/
                       /* Figure out where to start the pad most
                       extreme from the center of the die (0, 0)*/
      Select
         when c4polarity='odd' then do
            xstart=pads%2*cp     /* Start in the third quadrant and
      when
                                 odd, and it is the integer part of a
                                 division by two that gives the
                                 number of pads on one side of the
                                 y axis*/
            ystart=xstart        /* the y coordinate start equals
                                 the x coordinate start*/
         end
         otherwise               /* This is the even case*/
            xstart=-(pads/2-1)*cp-0.5*cp  /* There is a half
                                          pitch step from the y axis
                                          plus the number of spaces
                                          (pads/2-1) times the pitch*/
            ystart=xstart        /* the y coordinate start equals
                                 the x coordinate start*/
         end
      /* Create repeating column vector*/
      b=0                        /* b is the pad number counter*/
         do e=1 to pads          /* Start stepping from pad index
                                 number 1 to the number of pads in one
                                 column*/
            do t=1 to pads       /* Start stepping from pad index
                                 number 1 to the number of pads in
                                 one row*/
               b=b+1             /* Set up the index number for the
                                 die pad about to be defined in x and y*/
               xcoor=xstart+(e-1)*cp  /* x coordinate as a function of
                                      starting position plus the number
                                      pad within the row*/
               ycoor=ystart+(t-1)*cp  /* y coordinate as a function of
                                      starting position plus the number
                                      pad within the column*/
               padxy.b=xcoor||' '||ycoor  /* create a string that has two
                                          components, the x and y
                                          coordinate*/
            end                  /*Do Loop*/
         end                     /*Do Loop*/
      /* Assign the Die Pad Coordinate to a north, west, south, east side*/
         divider=chipwidth/chiplength  /* This represents the slope of an
                                       imaginary line struck between the
                                       origin and the corner of the die*/
      cnteast=0; cntnorth=0; cntwest=0; cntsouth=0;hit=0
                                 /*cnteast is the number of pads
                                 assigned to the eastern
                                 quadarant*/
      n=0;nn=0;nnn=0;nnnn=0
      do b=1 to chipio
         parse value padxy.b with chipx chipy
```

TABLE 18-continued

CENTROID DIE DATA GENERATION

```
            chipxx=chipx           /* need to call it something else because
                                      next line changes it just for one
                                      calculation */
            if chipx=0 then chipxx=.001   /* Die Pad on the Y axis is the
                                             Case of infiniteslope; then
                                             artificially set just off y axis*/
            chipslope=chipy/chipxx /* Strike a line from the center of
                                      the die to the center of the pad*/
         Select
            when abs(chipslope) <divider&chipxx>0 then do
                                   /* when the slope of line is less than
                                      the slope to the corner of the die and
                                      the xcoordinate is greater than zero,
                                      then you know you are on the east
                                      side*/
               side='East';cnteast=cnteast+1;end
            when abs(chipslope) <divider&chipxx<0 then do
                                   /* when the slope of line is less than the slope to
                                      the corner of the die and the xcoordinate is than
                                      than zero, then position on the west
                                      side*/
               side='West';cntwest=cntwest+1;end
            when abs(chipslope)>divider&chipy>0 then do
                                   /* when the slope of line is greater than the slope
to                                    the corner of the die and the ycoordinate is greater
                                      than zero, then position on the north
                                      side*/
               side='North';cntnorth=cntnorth+1;end
            when abs(chipslope)>divider&chipy<0 then do
                                   /* when the slope of line is greater than the slope
to                                    the corner of the die and the ycoordinate is less
                                      than zero, then position on the south
                                      side*/
               side='South';cntsouth=cntsouth+1;end
                                   /* Next to represent those that might be on the
                                      dividing line; alternate by taking the
                                      odd/even of a counter*/
            when abs (chipslope)=divider&chipy>0&chipx>0 then do
                                   /* On the Northeast dividing line*/
               n=n+1               /*Index the counter*/
            Select
               when n//2=0 then do /* when the counter is even,
                                      assign to North side*/
                  side='North'
                  cntnorth=cntnorth+1
               end
               otherwise           /* if the counter is not even, then
                                      it must be odd, so assign to East side*/
                  side='East'
                  cnteast=cnteast+1
               end
            end
            when abs(chipslope)=divider & chipy<0 & chipx<0 then do
                                   /* On the Southwest dividing line*/
               nn=nn+1
            Select
               when nn//2=0 then do /* when the counter is even,
                                       assign to South side*/
                  side='South'
                  cntsouth=cntsouth+1
               end
               otherwise           /* if the counter is not even, then it must be odd,
                                      so assign to West side*/
                  side='West'
                  cntwest=cntwest+1
               end
            end
            when abs(chipslope)=divider & chipy<0 & chipx>0 then do
                                   /* On the Southeast dividing line*/
               nnn=nnn+1
            Select
               when nnn//2=0 then do  /* when the counter is even, assign to
                                         East side*/
                  side='East'
                  cnteast=cnteast+1
               end
               otherwise           /* if the counter is not even, then it must be odd,
                                      so assign to South side*/
                  side='South'
                  cntsouth=cntsouth+1
               end
            end
            when abs(chipslope)=divider & chipy>0 & chipx<0 then do
                                   /* On the Northwest dividing line*/
               nnnn=nnnn+1
            Select
               when nnnn//2=0 the do  /* when the counter is even, assign
                                         to West side*/
                  side='West'
                  cntwest=cntwest+1
               end
               otherwise           /* if the counter is not even, then it must be odd,
                                      so assign to North side*/
                  side='North'
                  cntnorth=cntnorth+1
               end
            end
            otherwise;end
            padxy.b=padxy.b||' '||side   /* add on to the centroid string
                                            that has x and y coordinates with
                                            the quadrant side*/
         end
/*RANDOMIZE THE CHIP LABELS*/
            /*This section now takes the % Ground/Voltage to define the type
              of Chipio; either a signal, ground, or voltage*/
         chipgv=0                  /* Set the Ground and Voltage counter to Zero*/
            clip=100-chiprat       /* Find the percentage requested that is signal io*/
         Do b=1 to chipio          /* Start stepping through each chipio*/
            generate1=random(1,000)%1   /* Generate a random number
                                           between 1 and 100; % gives you
                                           the integer part only*/
         Select
            when generate1>clip then do  /* When the number is above
                                            the signal pct; it will be
                                            either a voltage or ground*/
               chipgv=chipgv+1     /* Add to the Ground and Voltage
                                      Counter*/
               generate2=random(1,2)  /* Now figure out whether it will be
                                         a voltage or ground by generating a
                                         number between 1 and 2*/
            Select
               when generate2=1 then do  /* if is 1 then it is a voltage*/
                  label='VDD        '
               end
               otherwise
                  label='VSS        '   /* if it is not 1 then it is a
                                           ground*/
               end
            end
            otherwise              /* when the number is below the clip,
                                      assign the label as signal*/
               label='Signal    '
            end
            padxy.b=format(b,5,0) ||' '||label||padxy.b
                                   /* add to the front of the centroid string
                                      the number of pad plus the S,G,V
                                      label*/
         end                       /*+DO Loop End*/
         end                       /* End Select*/
         when case='a' & tech='wb' then do
                                   /* Wire Bond CHIP PADS CALCULATION */
            kerf=.5*dp+75          /* Calculate the kerf, the distance between the
                                      die edge and the center of the first pad.
                                      It is a half a die pad plus the distance "edge"
                                      (defined by user to represent die edge to edge of
                                      die pad*/
            indent=1.25*dp+kerf    /* Indent is going to be the distance
                                      from the die pad to the edge, in the
                                      direction parallel to the succession of
                                      die pads; this keeps the pads from
                                      overlapping each other in the corners*/
```

TABLE 18-continued

CENTROID DIE DATA GENERATION

```
     dist=cz*1000-2*indent        /* This calculates the total distance,
                                      from extreme die pad centroid to
                                      extreme die pad centroid*/
     spaces=dist%cp               /* The integer part of the distance
                                      divided by the chip pitch; this gives
                                      you the number of spaces available*/
     pads=spaces+1                /* The total number of pads is the
                                      number of spaces plus 1*/
     chipio=4*pads                /* Total number of chipio is the pads
                                      on one side multiplied by 4*/
/* CHIP I/O DATASET CREATION */
/* Repeating Vector*/
                                  /* This will start die formation on the east side
                                      of the die; most southern point*/
     xstart=.5*cz*1000-kerf       /* Figure the centroid of the first
                                      die pad; it is half the chip size
                                      (cz;in microns)
                                      minus the kerf (calc. above)*/
     ystart=.5*spaces*cp          /* This calculates the y postion
                                      where the first pad will start*/
     do e=1 to pads               /* Create the repeating coordinates*/
        a.e=-1*ystart+(e-1)*cp
     end
/* COORDINATES FOR ALL PADS BUT IN 4 VECTOR SETS */
     /* Create the centroid string for each side.
        Contents will include: Pad #, X, Y, and side of Die */
     /*Start on the East side, then north, then west, then South (CCW)*/
     do n=1 to pads               /* Step thru pads on the east side*/
        id=n
        eastx.n=format(xstart,5,0)
                                  /* Create a matrix called eastx,
                                     with an index equal to the pad
                                     number, the coordinate will
                                     always equal xstart*/
        easty.n=format(a.n,5,0)
                                  /* Create a matrix called easty,
                                     with an index equal to the pad
                                     number, the coordinate will be a
                                     function of the pad number,
                                     ystart and, the chip pitch*/.
        padxy.id=eastx.n||'       '||easty.n||' East'
                                  /* Create the matrix padxy,
                                     whose value is a string and
                                     index is pad number that */
     /* Do the similar thing for the other 3 sides of the die,
     while giving each pad a successively higher pad number*/
     end
     do n=1 to pads
        id=1 *pads+n
        northx.n=-1*format(a.n,5,0)
        northy.n=format (xstart,5,0)
        padxy.id=northx.n||'      '||northy.n||' North'
     end
     do n=1 to pads
        id=2 *pads+n
        westx.n=-1*format (xstart,5,0)
        westy.n=-1*format (a.n,5,0)
        padxy.id=westx.n||'       '||westy.n||' West'
     end
     do n=1 to pads
        id=3*pads+n
        southx.n=1*format (a.n,5,0)
        southy.n=-1*format(xstart,5,0)
        padxy.id=southx.n||'      '||southy.n||' South'
     end
/* RANDOMIZE THE CHIP LABELS*/
     /* This is the same routine as was used in the area array pad
        generation; commenting therefore is similar/exact*/
chipgv=0
Do b=1 to chipio
  clip=100-chiprat
  generate1=random(1, 100) %1
Select
  when generate1>clip then do
       chipgv=chipgv+1
       generate2=random (1,2)
       Select
          when generate2=1 then do
             label='VDD         '
```

TABLE 18-continued

CENTROID DIE DATA GENERATION

```
          end
          otherwise
             label='VSS         '
          end
     end
     otherwise
        label='Signal      '
     end
  padxy.b=format(b,5,0)||'       '||label||' 'padxy.b
  end /*DO Loop End*/
end /* End When for Theoretical Die creation*/
```

Create BGA matrix step 222 for all cases A, B and C, starting with a full BGA matrix, creates a line of data with its x position, y position, slope from center of package, and quadrant. An alphanumeric matrix specifies the alpha/numeric location of the ball. Punch out depops data for balls that are not supposed to be there (from input). The resulting data set is separated into four separate quadrants. This step randomly assigns a type for each BGA pad in a quadrant to a signal, ground or voltage.

For case A and B, chip to BGA routing 224 separates chip centroid data into four matrices based on quadrant. The closest slope search routine starts on east side, takes the quadrant dividing slope (step 214) for this die pad position, determines the slope to all BGAs in the quadrant, and then finds the slope that is the closest to the quadrant dividing slope, and that slope defines the routing for this chip pad. Signal, but not ground and voltage, lines are thus routed. The selected BGA pad is then designated "used", and not available for subsequent pad selection. This process is repeated for die pads in order in this quadrant. The new maximum slope is that defined by the routing of the previous pad.

Step 226 calculates the runs, the power levels, wire bond fingers needed, and outputs to a file.

Step 228 uses Cramer's rule to solve for the intersection of all possible line combinations within the quadrant to see if the intersection falls within the space between a die pad and its connected BGA pad. If so, the count of crossings is incremented.

Step 230 generates summary file 112, and is more fully described in Tables 19–21.

TABLE 19

GOLD AND NICKEL CONSTANTS

```
/* GOLD AND NICKEL CONSTANTS */
gdens=19.3                    /* specific gravity of gold          */
ndens=8.89                    /* specific gravity of nickel        */
water=1/10000**3              /* grams per cubic micron            */
                              /*    of water                       */
goldcost=goldcost*16/454      /* $ per gram of gold                */
nickelcost=nickelcost* 16/454
                              /* $ per gram of nickel              */
numberrings=1                 /* number of bond rings in           */
                              /*    addition to the ground         */
                              /*    ring                           */
sqmicron2sqin=1/1000**2/2.54**2
                              /* conversion from sq microns        */
                              /*    to sq inches                   */
```

TABLE 20

CALCULATION OF GOLD AREA

```
/* GOLD AREA FOR GROUND RING, VOLTAGE RING(S) AND    */
/*    BOND FINGERS                                    */
/* unit of area used is in square microns             */
/* set width to voltage ring width established at the */
/*    beginning of the overall program                */
width=voltagewidth
/* ring area accumulator                              */
ringarea=0
/* create a routine that sums up the ring areas       */
/*    starting at the inner ground area and working out */
/*    j stands for the ring number; j=1 is the ground */
/*    ring, j=2 is the first voltage ring, j=3 is the */
/*    second voltage ring, etc.                       */
do j=1 to (numberrings+1)
    Select
        when j=1 then do
            width=groundwidth
        end
        otherwise
            width=voltagewidth
        end
    Select
        when j=2 then do
            voltageringpitch=groundwidth/2
                +ringspace+voltagewideth/2
        end
        otherwise
            voltageringpitch=voltagewidth+ringspace
        end
    ring1length=chiplength*1000+diespace+(j-1) *voltageringpitch
    ring2length=chipwidth*1000+diespace+(j-1) *voltageringpitch
    ringarea=(ring1length+ring2length) *width*2+ringarea
end
/* end of summation of ring areas                     */
/* Calculate the total area of all the wire           */
/*    bond fingers                                    */
Finger=chipsig*wbfingerlgth*wbfingerwdth
/* GOLD AREA FOR VIAS ON FULL GOLD FOR CAVITY         */
/* Via area is the addition of the lands (top and     */
/*    bottom; which are disks) and the inner vertical */
/*    surface                                         */
finishedvia=viasize-2cuthk
/* Estimate via count for cavity, 16 vias added in    */
viacnc=.3*chipsig+4*4*numberrings
/* Calculate lands                                    */
vialandsc=2*3.1416* (viapadf**2-finishedvia**2)/4*viacnc
/* Inside vertical surface of PTH                     */
viainnerc=finishedvia*3.1416*lamthick*viacnc
/* Lands + Inner Surface                              */
viagdc=vialandsc+viainnerc
/* FLOWER PAD                                         */
/* Estimate the diameter of the solid part of the     */
/*    Flower Pad                                      */
diaf=.5*cz*1000
/* Add the Petals of the Flower plus the Circular     */
/*    Area                                            */
flower=6*cz*1000*petalwidth+3.1416*diaf*diaf/4
/* GOLD AREA OF VIAS FOR SELECTIVE DIE UP FLOWER      */
/*    AND RING REGIONS                                */
/* Estimate 2 vias per .25"x.25" area FOR DIAUP       */
/*    FLOWER AREA                                     */
Viacndflower=flower/(6.35**2*1000**2) *2
/* Total number of drilled vias in a Diaup            */
viacnd=viacndflower+chipsig
/* Total nunber of Backside(S2) Land Area             */
viagdd=viacndflower*3.1416* (viapadb**2=finishedvia**2)/4
/* Estimate of ground bussing typically found on      */
/*    S2 under the die                                */
groundbussd=3.1416*diaf*diaf/4
/* Adjust flower area for vias and inner surface      */
flower=flower-3.1416* (viasize-2*cuthk) **2/4*viacndflower
    +3.1416* (viasize=2*cuthk) *viacndflower
/* GOLD AREA BGA PADS                                 */
bgarea=)bgapadsize**2*3.1416/4)
    +dogwidth* (bgaprocoat=bgadia)/2
/* Number of BGA pads on a cavity                     */
bgac=modio*bgarea
```

TABLE 20-continued

CALCULATION OF GOLD AREA

```
/* Number of BGA pads on a dia up                     */
bgad=bgac+thermal*bgarea
/* STIFFENER AREA                                     */
/* Stiffener is a piece of copper, the size of the    */
/*    substrate, on cavity parts                      */
stiff=size*size*1000*1000
/* CAVITY WALL AREA                                   */
/* This is the area, on a cavity only, where the      */
/*    ground ring wraps around the corner and downward */
/*    to the S2                                       */
cav=((chipwidth*1000+diespace) *2
    +(chiplength*1000+diespace)) * (lamthick+2*cuthk)
/* CAVITY WIRING AREA FRONT AND BACK                  */
/* Figure out the area remaining that is available for */
/*    wiring and then apply a percentage of that area */
/*    that is wiring distance in one dimension        */
/*    encompassing the fingers, die, etc.             */
innerside=(outeractual/1000-spacefnactual)
/* Area of this innerside                             */
innerarea=innerside*innerside
/* Area of part, minus inner area, lands, BGA         */
wiringarea=stiff-innerarea-vialandsc-bgac
/* Estimate wiring covers 30% front 10% back          */
wdensc=(0.3+0.1) *wiring area
/* CIRCUIT WIRING GOLD SUMMATION                      */
/* Add fingers and bonding rings; these are the       */
/*    surface that are bonded to                      */
bondinggold=finger+ringarea
/* GOLD RUNNER                                        */
/* Gold runner is a small area used during the molding */
/*    process for die up                              */
goldrun=goldrunwidth*goldrunhgt
/* TOTAL GOLD FOR CAVITY                              */
/* Add the bonding surfaces, vias, wiring, cavity     */
/*    wall, and BGA                                   */
togold=bondinggold+viagdc+bga+cav
/* Multiply by gold thickness to get volume and       */
/*    multiply by density                             */
cost=goldcost* (tcgold+stiff) *goldthk*water*gdens
/* TOTAL GOLD FOR DIE UP SELECTIVE                    */
/* Add the bonding surfaces, flower pads, vias, BGA,  */
/*    and ground buss                                 */
tdgold=bondinggold+flower+viagdd+bgad+groundbussd
/* Multiply by gold thickness to get volume and       */
/*    multiply by density                             */
dcst=goldcost*tdgold*goldthk*water*gdens
```

Table 21 is a pseudo code representation of choke factor determination. Choke factor is a measure of the amount of room left between the bond fingers and either the array of via lands (in a die up) or BGA pads (in a cavity). It is not a linear dimension but is unitless. It is unitless because the linear space is divided by the wiring pitch. This by definition is then the number of wiring pitches that can fit into the allotted space. Lower numbers are more choked, higher numbers are less choked. Negative numbers mean that there is no fanout room.

Dividing by the pitch gives a relative measure of the distance verses the 'fineness' of the wiring technology. A choke clip level is used to determine whether the module can be wired.

TABLE 21

CHOKE FACTOR DETERMINATION

```
/* DISTANCE LEFT FOR FINGERS AND FANOUT               */
/* Units are microns                                  */
/* Calculate the distance from the center of the      */
/*    substrate to the furthest voltage ring          */
/* Width of ground ring + space between rings         */
/*    + voltage ring width*number of rings            */
```

TABLE 21-continued

CHOKE FACTOR DETERMINATION

```
/* Cz is the die in mm                                      */
inner=cz/2*1000+rings
/* The following routine determines the square that         */
/*   inscribes either the BGA pads (in a cavity), or        */
/*   the via land (in a dieup). This square is              */
/*   tangent to the                                         */
/*   inside edge of either pad; and it is towards the       */
/*   die. A matrix outer.k represents the size of           */
/*   the spare for all possible depopulatons of BGA         */
/*   balls. In reality, outer.k is half the length          */
/*   of the square.                                         */
/* Depop.k is a matrix that existed higher up in the        */
/*   overall program, and is an array whose value is        */
/*   the number of positions in the depopulated BGA         */
/*   matrix.                                                */
/* The index, k, represents the number of outer rows        */
/*   in the depopulated BGA matrix.                         */
/* Maxouterrow is calculated higher in the overall          */
/*   program and is the largest number of outer             */
/*   rows that a particular substrate size can              */
/*   possibly have.                                         */
do k=1 to maxouterrow
Select
when style='cavity' then do
/* This figures the distance from the center of the         */
/*   module out to the linear edge of BGA precoat,          */
/*   of the inner roll of balls.                            */
outer.k=(depop.k-1)/2*bgapitch_bgapitch-bgaprocoat/2
end
when style='dieup' then do
/* This figures the distance from the center of             */
/*   the module out to the inner edge of the via            */
/*   land on the inner rows of vias.                        */
outer. k=(depop.k-1)2*bgapitch+bgapitch+doglength-viapadf/2
end
otherwise; end
/* This is the calculation of the distance between the      */
/*   BGA or Vias and rings; this is left for fingers        */
/*   and fanout                                             */
spaceff. k=(outer.k-inner)/;1000
/* These three equations calculate the space left           */
/*   after subtracting out that needed for the wire         */
/*   bond wire and its pad and its procoat. The three       */
/*   equations are similar, except for a variance of        */
/*   bondwire length, nominal, high, and low.               */
spacefn.k=(outer.k-((cz/2*1000)-indent)-wbnom
    -wbfingerlgth/2-wbprocoat)/1000
spacefh.k=(outer.k-((cz/2*1000)-indent)-wbhi
    +wbfingerlgth/2-wbprocoat)/1000
spacefl.k=(outer.k-))cz/2*1000)-indent)-wblo
    +wbfingerlgth/2-wbprocoat)/1000
/* Fanout length as a multiple of finest wiring pitch       */
/* This is the choke factor: fancha.k                       */
/* fancha.k is the nominal space for fanout, converted      */
/*   to microns and divided by the wiring pitch             */
/* The wiring pitch is a constant and it is defined         */
/*   high up in the code as wire width+wire space           */
/* The index, k, represents the number of outer rows        */
/*   of BGA                                                 */
/* Choke Factor fancha.k                                    */
fancha.k=spacefn.k*1000/wirepitch
.
.
.
end                              /* End do loop             */
```

Advantages over the Prior Art

It is an advantage of the invention that there provided an improved system and method for simulating and graphically assessing the cost and feasibility of general and specific wiring design cases.

It is an advantage of the invention that there provided a system and method for simulating general and specific wiring design cases and quickly assess the simulated design graphically.

It is an advantage of the invention that there provided a system and method for assessing a simulated wiring design with respect to crossing, choking, signal runs, wiring channels and input/output.

It is an advantage of the invention that there provided a system and method for providing simulated design graphical data to a wiring design tool.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming languages such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for modeling and estimating substrate characteristics preliminary to preparing a detailed design, comprising the steps of:

receiving input parameters including die size and substrate size;

said receiving step including initializing a code module to model substrate characteristics, and setting case variables including selectively designating a first case for calculating a die and net list, a second case responsive to a user specified die list and for calculating a net list, or a third case wherein said user specifies both a die list and a net list;

selectively receiving or deriving a netlist of interconnections between said die and said substrate;

said selectively receiving step including determining full matrix parameters, selectively creating die, centroid string for die, or die and array centroid strings, creating an array matrix, and selectively routing chip pads to array pads;

responsive to said input parameters and netlist, generating a representation of an optimized estimated fanout of said interconnections; and graphically displaying said optimized estimated fanout together with a set of substrate parameters derived from said optimized estimated fanout.

2. System for modeling and estimating substrate characteristics preliminary to preparing a detailed design, comprising:

means for receiving input parameters including die size and substrate size, for initializing a code module to model substrate characteristics, and for setting case variables including selectively designating a first case for calculating a die and net list, a second case responsive to a user specified die list and for calculating a net list, or a third case wherein said user specifies both a die list and a net list;

means for selectively receiving or deriving a netlist of interconnections between said die and said substrate, determining full matrix parameters, selectively creating die, centroid string for die, or die and array centroid strings, creating an array matrix, and selectively routing chip pads to array pads;

means responsive to said input parameters and netlist for generating a representation of an optimized estimated fanout of said interconnections; and means for graphically displaying said optimized estimated fanout together with a set of substrate parameters derived from said optimized estimated fanout.

3. A program storage device readable by a machine, tangibly embodying a program of instructions executable by a machine to perform method steps for modeling and estimating substrate characteristics preliminary to preparing a detailed design, said method steps comprising:

receiving input parameters including die size and substrate size;

said receiving step including initializing a code module to model substrate characteristics, and setting case variables including selectively designating a first case for calculating a die and net list, a second case responsive to a user specified die list and for calculating a net list, or a third case wherein said user specifies both a die list and a net list;

selectively receiving or deriving a netlist of interconnections between said die and said substrate;

said selectively receiving step including determining full matrix parameters, selectively creating die, centroid string for die, or die and array centroid strings, creating an array matrix, and selectively routing chip pads to array pads;

responsive to said input parameters and netlist, generating a representation of an optimized estimated fanout of said interconnections; and graphically displaying said optimized estimated fanout together with a set of substrate parameters derived from said optimized estimated fanout.

4. An article of manufacture comprising:

a computer useable medium having computer readable program code means embodied therein for modeling and estimating substrate characteristics preliminary to preparing a detailed design, the computer readable program means in said article of manufacture comprising:

computer readable program code means for causing a computer to effect receiving input parameters including die size and substrate size, for initializing a code module to model substrate characteristics, and setting case variables including selectively designating a first case for calculating a die and net list, a second case responsive to a user specified die list and for calculating a net list, or a third case wherein said user specifies both a die list and a net list;

computer readable program code means for causing a computer to effect selectively receiving or deriving a netlist of interconnections between said die and said substrate including determining full matrix parameters, selectively creating die, centroid string for die, or die and array centroid strings, creating an array matrix, and selectively routing chip pads to array pads;

computer readable program code means for causing a computer to effect responsive to said input parameters and netlist, generating a representation of an optimized estimated fanout of said interconnections; and computer readable program code means for causing a computer to effect graphically displaying said optimized estimated fanout together with a set of substrate parameters derived from said optimized estimated fanout.

5. A computer program product or computer program element for modeling and estimating substrate characteristics preliminary to preparing a detailed design according to the steps of:

receiving input parameters including die size and substrate size, said receiving including initializing a code module to model substrate characteristics, and setting case variables including selectively designating a first case for calculating a die and net list, a second case responsive to a user specified die list for calculating a net list, or a third case wherein said user specifies both a die list and a net list selectively receiving or deriving a netlist of interconnections between said die and said substrate;

said selectively receiving step including determining full matrix parameters, selectively creating die, centroid string for die, or die and array centroid strings, creating an array matrix, and selectively routing chip pads to array pads;

responsive to said input parameters and netlist, generating a representation of an optimized estimated fanout of said interconnections; and graphically displaying said optimized estimated fanout together with a set of substrate parameters derived from said optimized estimated fanout.

6. The method of claim 1, said initializing step further including selectively designating output files, die pitch, number of desired die input/output pads, number of outer rows, and number of array input/output pads.

7. The method of claim 1, said setting step further including selectively designating a first case wherein said code module calculates a die and net list, a second case wherein a user specifies a die list and said code module calculates a net list, or a third case wherein said user specifies both a die list and a net list.

8. The method of claim 1, said setting step further including selectively designating flip chip or wirebond assembly technology.

9. The method of claim 7, said setting step further including designating one or more chip parameters from among the group of chip parameters including chip size, chip width, chip length, chip pitch, chip I/O, die pad size, die pad shape, and percent ground and voltage.

10. The method of claim 7, said setting step further including designating one or more package parameters from among the group of package parameters including configuration, laminate size, module I/O count, number of outer rows, ball grid array pitch, number of line vertex points, number of rings, width of voltage and ground rings, spacing of voltage and ground rings, size of via features, increment of variable width, wire bond length, and wiring rules.

11. The method of claim 1, said determining step further including the steps of:

defining the array quadrants;

selectively calculating depopulation based upon user desired number of I/O pads or number of outer rows; and entering an alpha designation for each row.

12. The method of claim 8, said creating step for said first case further including the steps of creating said centroid data selectively for said flip chip or wire bond configuration as a wirebond single row peripheral or flip chip area array configuration.

13. The method of claim 8, said creating step for said second case further comprising the steps of:
    responsive to user provided centroid data, assigning each pad to a quadrant;
    reordering the order of said pads as may be required while, for wirebound, determining minimum chip pitch and curve.

14. The method of claim 13, said creating step further comprising the step of calculating composition ratios.

15. The method of claim 7, said creating step for said third case further including the steps of assigning pads to quadrants and calculating composition ratios.

16. The method of claim 7, said creating step further comprising the steps of:
    building a matrix of array pad data, including:
        assigning array input/output pads to quadrants;
        determining for each said array pad its coordinates and slope;
        specifying an alpha/numeric location of each said array pad; and
        depopulating from said matrix data for array pads in a punch out area.

17. The method of claim 16, further comprising the step of randomly assigning a type for each said array pad, said type being selected from the group of types including signal, ground, and voltage.

18. The method of claim 7, said routing step further comprising the steps of:
    determining quadrant dividing slopes;
    separating centroid data into four matrices based on quadrant;
    executing a closest slope search routine, including:
        determining the slope of a first signal die pad in a first quadrant;
        finding the slope to remaining array pads within said first quadrant;
        selecting from said remaining array pads the array pad having a slope most closely matching the quadrant dividing slope for said first quadrant;
        defining the routing for said first signal die pad to the selected array pad;
        removing said selected array pad from the set of said remaining array pads and setting said quadrant dividing slope to the slope of said selected array pad;
    repeating said executing step for each said signal die pad in each said quadrant.

19. The method of claim 1, further including the step of assigning to each array pad a type, and said analyzing step further comprising the step of calculating runs of array pads of a same type.

20. The method of claim 1, further comprising the steps of:
    first generating a crossing file;
    second generating a summary file;
    third generating a script file.

21. The method of claim 20, further comprising the steps of:
    selectively outputting drill data;
    selectively outputting array coordinate data; and
    selectively executing said script file.

22. The method of claim 20, said first generating step further comprising the steps of:
    determining the intersection point for each possible pair of line combinations within a quadrant;
    calculating a crossing count for each said quadrant, said crossing count being the number of said intersection points for lines within said each quadrant falling within the space between a die pad and a connected array pad for a pair of lines.

23. The method of claim 20, said second generating step further comprising the steps of:
    determining choke factor;
    determining complexity factor;
    determining gold area factor; and
    storing said factors and input parameters to said summary file.

24. The method of claim 20, said third generating step further comprising the steps of:
    defining laminate coordinates for top view and side view;
    defining die coordinates for top view and side view; and
    drawing chamfer.

25. The method of claim 20, further comprising the step of:
    displaying an annotated graphical drawing of said substrate showing point to point connections between die pads and array pads, alpha numeric pad designations, chip input parameters and substrate parameters.

* * * * *